(12) United States Patent
DeMers et al.

(10) Patent No.: US 6,346,892 B1
(45) Date of Patent: *Feb. 12, 2002

(54) METHOD AND APPARATUS FOR AIRCRAFT SYSTEMS MANAGEMENT

(75) Inventors: Robert E. DeMers, Elk River; Victor A. Riley, Shoreview, both of MN (US)

(73) Assignee: Honeywell International Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/307,641

(22) Filed: May 7, 1999

(51) Int. Cl.[7] .............................................. G08B 21/00
(52) U.S. Cl. .......................... 340/945; 340/995; 701/14
(58) Field of Search ................................. 340/945, 963, 340/971, 973, 995; 701/3, 9, 14; 244/1 R

(56) References Cited

U.S. PATENT DOCUMENTS

| | | | |
|---|---|---|---|
| 4,343,990 A | | 8/1982 | Ueda |
| 4,438,505 A | * | 3/1984 | Yanagiuchi et al. ......... 340/900 |
| 5,059,965 A | * | 10/1991 | Geiser ......................... 340/995 |
| 5,072,395 A | * | 12/1991 | Bliss et al. .................. 364/443 |
| 5,475,594 A | | 12/1995 | Oder |
| 5,652,897 A | | 7/1997 | Linebarger et al. ......... 395/754 |
| 5,708,822 A | * | 1/1998 | Wical ............................. 704/1 |
| 5,721,938 A | * | 2/1998 | Stuckey ......................... 704/4 |
| 5,825,306 A | * | 10/1998 | Hiyokawa et al. .......... 340/988 |
| 5,844,503 A | | 12/1998 | Riley et al. .................. 340/945 |
| 5,951,609 A | * | 9/1999 | Hanson et al. ................ 701/14 |
| 5,986,543 A | * | 11/1999 | Johnson ....................... 340/995 |

FOREIGN PATENT DOCUMENTS

| | | |
|---|---|---|
| DE | 3722857 | 1/1989 |
| EP | 0145683 | 6/1985 |
| WO | 9814993 | 4/1998 |

OTHER PUBLICATIONS

Co–pending application entitled "Aircraft Utility Systems and Control Integration," D.G. Endrud, Ser. No. 8/721,818.
Co–pending application entitled "Automated Aircraft," D.G. Endrud, Ser. No. 09/042057.
Sims, MJ, "Automatic State Table Generation," Hewlett–Packard Journal, Dec. 1, 1994, pp.21–26, vol. 45, No. 6, Hewlett–Packard Co., Palo Alto, CA, US.

* cited by examiner

Primary Examiner—John Tweel, Jr.

(57) ABSTRACT

Aircraft and other systems employing various condition settable parameters are controlled utilizing a command language, display, and input device for entering certain desired parameters with a parser programmed to interpret various alternate expressions which have been entered into a predetermined format recognizable by a computer which is operable to display the parsed command and upon approval to input the computer for controlling the desired parameter.

19 Claims, 7 Drawing Sheets

METHOD AND APPARATUS FOR AIRCRAFT SYSTEMS MANAGEMENT

BACKGROUND OF INVENTION

1. Field of the Invention

This invention relates to aircraft systems management and more particularly to an extension of the system described and claimed in our U.S. Pat. No. 5,844,503 entitled "Method and Apparatus for Avionics Management" issued Dec. 1, 1998 and assigned to the assignee of the present invention. (Referred to herein as the 503 patent). In the 503 patent, a system, usable with a flight management computer, is presented using a plurality of commands (action, target and parameter words) formed in air traffic control syntax to provide the computer with an input necessary to accomplish the commands. In the 503 patent, the computer operates to interpret a number of words in each category of command to enable the control of various aircraft functions such as airspeed, altitude etc. The disclosure contained in the 503 patent is incorporated here by reference. Reference should also be had to a co-pending application entitled Aircraft Utility Systems and Control Integration, Ser. No. 08/721,818 filed Sep. 27, 1996 (herein referred to as the 818 application) and a co-pending application entitled Automated Aircraft Ser. No. 09/042057 filed Mar. 13, 1998, (herein referred to as the 057 application) both in the name of Douglas G. Endrud and both assigned to the assignee of the present invention.

The present invention utilizes a control language dissimilar to the language of the 503 patent in that it is not in air traffic control syntax but is in an easily understandable form for both human and computer so as to quickly and accurately provide human understanding while enabling the computer to perform specific control functions associated with interior aircraft operations such as cabin temperature, cabin pressure and the like. Also included in the present invention is a "parser" which is used to assemble the inputs made by the aircraft personnel into the proper syntax for use by the computer and to determine the properness of the commands.

2. Description of the Prior Art

Present day aircraft utilities management systems utilize a plurality of control knobs and switches to manage the interior operations of the aircraft. (See, for example, FIG. 1 of the 818 application). Utilizing a plurality of knobs and switches to change interior operations of the aircraft, the pilot must find the control knob or switch for the desired operation and turn or switch it to the desire setting. This requires a search and a manual operation usually deflecting the pilot's eyes from the control panel and/or a view of the surrounding air space for considerable time periods. One solution to this problem is found in the 818 application and in the 057 application.

BRIEF DESCRIPTION OF THE INVENTION

The present invention draws upon the teachings of the above co-pending applications to establish a yet more simplified way to perform the desired control. More particularly, the present invention uses a control language, which is recognizable in common syntax for use in accomplishing changes and settings to the interior aircraft control functions in a rapid manner. While the specific language of the possible instructions may vary from pilot to pilot, the present invention employs a parser which is programmed to interpret various alternate ways of expression, recognize predetermined cue words, and place the instruction in a preferred form which will be acceptable for the computer to understand and perform the commands. One function of the parser is to categorize the pilot input into a relatively small number of sub instructions falling into "system", "action" and/or "target" categories. "Systems" may be considered the aircraft system (e.g. cabin temperature, overhead light, pressure, etc.) upon which some action is desired. "Actions" may be thought of as verbs (e.g. connect, raise, open, select, etc.), and prepositions (to, between, from, above, etc.) and in some cases merely "on" or "off". "Targets" are the units or conditions of some of the nouns (pounds, degrees, feet, on, off, etc.). Sentences made up of these commands are put in a format which the computer and the human operator will recognize. If, for example, the pilot desired to change the aft cabin temperature to 80 degrees, he might enter "aft cabin temperature to 80 degrees". The Parser would recognize "aft cabin" and "temperature" as a system to be acted on and would be programmed to assume that a change in aft cabin temperature was desired since that is all that could happen. The parser would also recognize "80" and would be programmed to assume that this was the desired new temperature and that it was in Fahrenheit degrees (or if desired, in Centigrade). Accordingly, the simplified command "Aft Cabin Temp To 80 Degrees" would be understood by computer and by the pilot to indicate the desired change in cabin temperature. Even the word "To" could be omitted since it would be presumed and other words such as "at" might also be presumed depending on the context.

It is desirable that the command which the pilot enters appear on a display, located on the control panel (preferably in an anti-glare area such as near the navigation display) so as to minimize the distraction. In order to produce this display a keyboard, cursor control device, speech recognition equipment or other I/O device may be employed. When the command is complete and clear, the parser need do no more than revise it for the computer's use but, in some cases, the operator might enter a partial command, which the parser would not completely recognize. For example, the pilot might enter a partial command such as "temperature" and the parser would interpret the "temperature" command as requiring a change to a desired or new temperature but would not know what portion of the aircraft was involved nor the desired temperature. Accordingly, the parser would cause a menu to appear listing the various items where the temperature could be made to change. One of these would be "aft cabin temperature" which the pilot would then select and this phrase would be displayed. The parser would still not know the desired new temperature and might then display "enter desired new temperature" which would result in the pilot entering "80 degrees", which would then be displayed. Upon recognition of a valid executable command string, the system would allow the pilot to enter the "go" command, causing the computer to command the temperature utility control to produce the desired change. If the pilot merely entered "aft cabin", the parser would interpret this to require some change in a condition of the aft cabin, in which case, the parser might cause a menu showing the various conditions (temperature, lighting, pressure, etc.) and again the pilot would select "aft cabin temperature" and cause this phrase to be displayed. Alternately, the pilot may wish to reduce the number of keystrokes required and simply enter the letter "A" and all of the functions starting with the letter "A" would be displayed on the menu. The pilot would then scroll down to select "aft cabin temperature" which would again be displayed.

The parser may also be programmed to recognize an action command such as "increase" or "decrease" or "change" or simply "to" which the pilot would enter.

Alternately, in the case of most of the systems in an aircraft, a change can be expressed merely by the word "to". Since the only action involving the cabin temperature is to change it, the parser would automatically insert the word "to" after the "aft cabin temperature" in sending the message to the computer. The next step would be to enter the parameter command which in this case would be the desired temperature in degrees (generally in Fahrenheit). Accordingly, the pilot would enter "80" or "80 degrees", and the parser would send "80°" to the computer. Both the computer and the pilot are able to understand this command "aft cabin temperature to 80 degrees" so that when the pilot is satisfied from the monitor that the desired commands is correct, he may activate the "go" command on the control panel, as for example pressing a "go" button and the desired action will be programmed in the proper syntax to the computer which will then operate on these commands and produce outputs which will cause the desired action to be accomplished utilizing the existing control equipment on the aircraft. It would also be desirable to have the flight management commands be synchronized with the interior aircraft functions so that, for example, the command "cabin lights off below 1000 feet" would be accomplished. Here it is seen that both flight control functions and cabin functions are combined into a single commanded string that associates utility functions with a flight path state.

If the pilot erred and forgot to enter the "0" after "8", another function of the parser would be to know that the cabin temperature should never be "8 degrees" and would alert the pilot to the error. Actually, the parser will recognize that commands are entered in sequence and will not take the entry of an "8" as an error until it is clear that the full command has been in putted. The parser can be thought of as having a "syntax" function useful in setting pilot commands in proper form for the computer and having a "semantic" function useful in establishing complete and sensible input commands and detecting errors. In all cases, the display would soon read "aft cabin temp to 80 degrees", after which the pilot would activate the "go" button to cause the now proper syntax and semantic command to be entered into the computer for execution.

It can be seen that the ability to encapsulate both flight path and utility functions into a single command environment provides a very powerful tool for automating checklists and utility management procedures. Systems covered include electrical, hydraulic, environment, lighting, bleed air, propulsion, fuel sensors, pressurization, communication, etc.

DETAILED DESCRIPTION OF THE PREFERRED EMBODIMENTS

Figure 1:
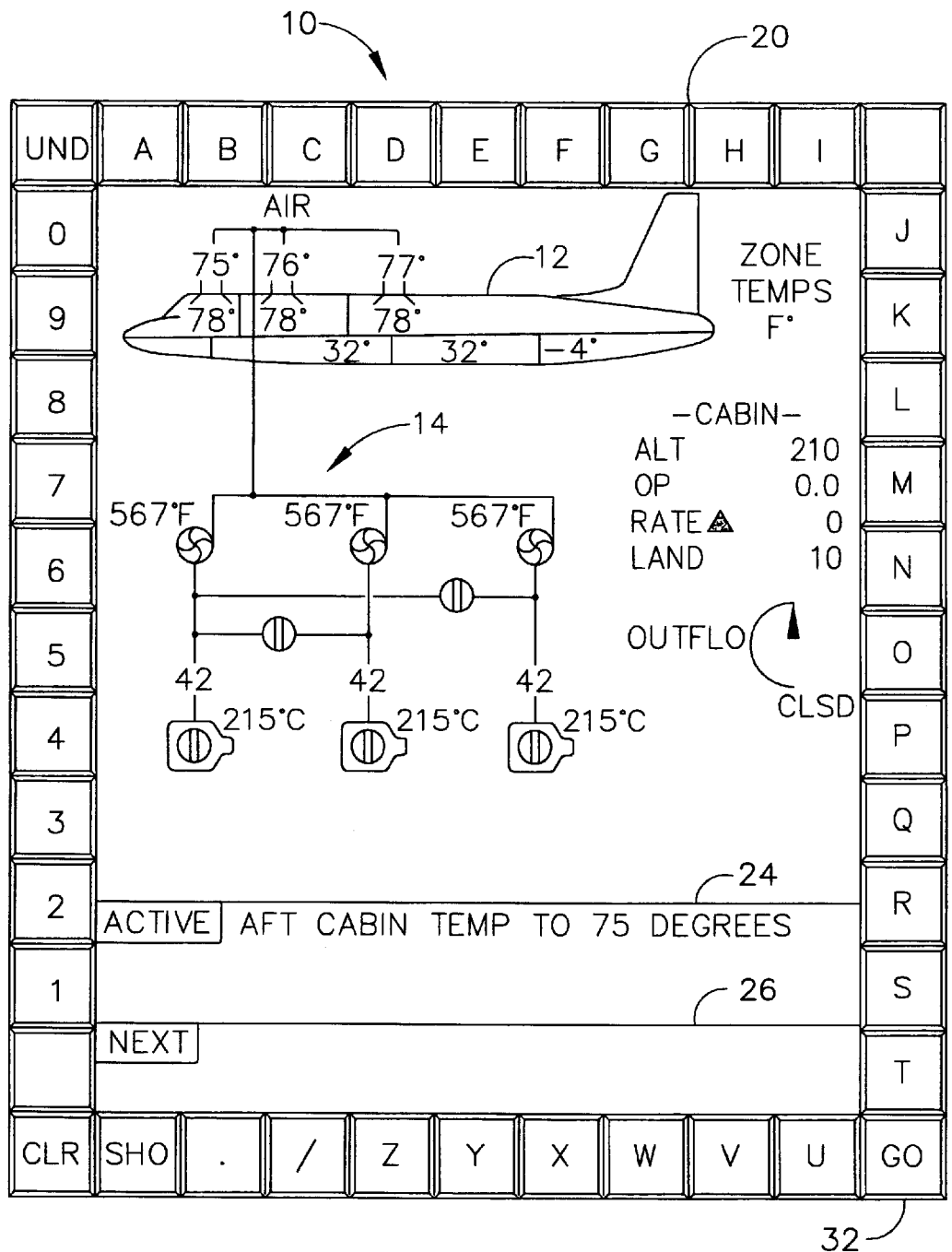
FIG. 1 shows a layout of one configuration of the display for the control panel with a layout showing the aircraft and the various temperatures therein.

FIG. 1 shows one configuration for a display 10, which may be located on the control panel near the display found in the 818 application. Generally this is in a center section of the forward panel below the windshield. The display 10 is shown having a representation of an aircraft 12 and the cooling/heating system 14 leading to the various compartments that are heated, i.e., the cockpit, the forward section, the aft section, and the storage sections below. This display is one presently used on some aircraft. We have altered the display by placing a set of buttons 20 with alphabetical markings and other indicia around the periphery thereof as a keyboard for use in entering commands. Of course, other keyboards and/or cursor control devices may also be employed. We have also added two areas 24 and 26 below the system representation along with the words "active"(to show the present condition of variable which was last changed) and "next" (to show the desired conditions of a variable to be changed).

In FIG. 1 it has been assumed that the pilot has entered a cabin temperature command calling for the depiction of the aircraft and temperature control system seen displayed. A number of different systems may be available for display and some of these can be seen in the following chart along with the lead actions and targets which may be involved. In many cases this is simply "on" or "off" or "open" or "closed."

| Lead actions | System | Targets |
|---|---|---|
| | AIR: | |
| | Pack Flow | Low |
| | | Normal |
| | | High |
| | Cockpit Temp | Degrees F./C. |
| | Fwd Cabin Temp | Degrees F./C. |
| | Aft Cabin Temp | Degrees F./C. |
| | Engine 1(2) bleed | On |
| | | Off |
| | Pack 1(2) | On |
| | | Off |
| Open | Ram Air Inlet | Opened |
| Close | | Closed |
| | APU bleed | On |
| | | Off |
| Close | Cross bleed | Closed |
| | | Auto |
| Open | | Opened |
| Open | Cargo Isolation Valve | Open |
| Close | | Closed |
| | Cargo hot air pressure regulator | On |
| | | Off |
| | Cargo temp | Degrees F./C. |
| | Cabin Pressure | Auto |
| | | Manual |
| | | Ditch |
| | Landing Elevation | Auto |
| | | # ft. (−2000 to 14000) |
| | COMMUNICATIONS: | |
| | 3rd Occupant mikes | Captain |
| | | First Officer |
| | | Normal |
| Display | VHF 1(2,3) | Display |
| Display | HF 1(2) | Display |
| | HF | AM mode |
| | Transmit | VHF 1(2,3) |
| | | HF 1(2) |
| | | Cabin (attendants) |
| | Receive | VHF 1(2,3) |
| | | HF 1(2) |
| | | Internal |
| | | VOR1 (2) |
| | | MKR |
| | | ILS |
| | | MLS |

-continued

| Lead actions | System | Targets |
|---|---|---|
| | VHF 1(2,3) volume | ADF1 (2) Cabin Higher (Up) Lower (Down) |
| | HF 1(2) volume | Higher (Up) Lower (Down) |
| | INT volume | Higher (Up) Lower (Down) |
| | VOR1 (2) volume | Higher (Up) Lower (Down) |
| | MKR volume | Higher (Up) Lower (Down) |
| | ILS volume | Higher (Up) Lower (Down) |
| | MLS volume | Higher (Up) Lower (Down) |
| | ADF 1(2) volume | Higher (Up) Lower (Down) |
| | Boom/Mask Mikes | Internal Neutral Radio |
| Inhibit | VOR nav signals | Inhibit |
| Inhibit | ADF nav signals | Inhibit |
| Reset | Audio controls | Reset |
| | VOR receiver | Manual Flight Mgmt Guidance Sys |
| | ILS receiver | Manual FMGS |
| | ADF receiver | Manual FMGS |
| display | VOR Frequency | |
| display | ILS Frequency | |
| display | MLS Frequency | |
| display | ADF Frequency | |
| | Standby frequency | # active |
| | BFO | On Off |
| | Cockpit Loudspeaker | Off Softer Louder Max |
| | Receive | PA |
| | PA volume | Higher (Up) Lower (Down) |
| | Transmit | PA |
| advise | Attendant | |
| Call | Forward attendant | |
| Call | Aft attendant | |
| Call | Mechanic | |
| Call | All attendant emergency | |
| | ELECTRICAL: | |
| | Galley Electrical | On Off |
| Connect Disconnect | Galley Battery 1(2) | Connected Disconnected |
| | APU Generator | On Off |
| | Generator 1(2) | On Off |
| | IDG 1(2) | On Off |
| Connect Disconnect | Bus | Connected Disconnected Auto |
| | External power | On Off |
| | AC essential feed | Normal Alternate |
| | Emergency generator | Test |
| Connect Disconnect | Generator 1(2) | Connected Disconnected |
| Extend | Ram Air Turbine | Extend Auto |

-continued

| Lead actions | System | Targets |
|---|---|---|
| | FIRE: | |
| Test | Engine 1 (2) | Test |
| Arm | | Armed |
| Extinguish | | Extinguish |
| Test | APU | Test |
| Arm | | Armed |
| Extinguish | | Extinguish |
| Test | Cargo | Test |
| Arm | | Armed |
| Extinguish | | Extinguish |
| | FLIGHT CONTROLS: | |
| | ELAC 1(2) | On Off |
| | SEC 1(2,3) | On Off |
| | FAC1(2) | On Off |
| | Rudder trim | Left (+/−20 Degrees) Right (+/−20 Degrees) |
| Reset | | Reset |
| | Flaps/Slats | Position 1(2,3,4,full) |
| Retract | Speed brakes | Retract ¼, ½, ¾, full |
| | Pitch trim | # degrees up # degrees down |
| Reset | | Reset |
| | Autopilot | On Off |
| | Radio | On Off AM mode |
| | Avionics | Smoke mode |
| | FUEL: | |
| | Center Pump 1(2) | On Off Auto mode Manual mode |
| | Right Pump 1(2) | On Off |
| | Left Pump 1(2) | On Off |
| | Cross Feed | On Off |
| | HYDRAULICS: | |
| | Electric Pump 1;(2,) | On Off |
| | Electric Pump 3 | On Off |
| | Engine pump 1(2) | On Off |
| | Pump override | On Off |
| | Leak Measurement valves | On Off |
| Extend | RAT | Extend Auto |
| | ICE AND RAIN: | |
| | Engine 1(2) Anti-Ice | On Off |
| | Window Heat | On Auto |
| | Probe Heat | On Auto |
| | L(R) Wiper | Off Slow Fast |
| | Rain Repellent | On |
| | Wing Anti-ice | On Off |

-continued

| Lead actions | System | Targets |
|---|---|---|
| | INSTRUMENTS/RECORDERS: | |
| | CVR | On |
| | | Off |
| Erase | | Erase |
| Test | | Test |
| | DFDR | On |
| | | Off |
| Set event | | Set event |
| Start | Chronograph | Start |
| Stop | | Stop |
| | Chronograph month | (digits) |
| | Chronograph year | (digits) |
| | Chronograph day | (digits) |
| | Chronograph hours | (digits) |
| | Chronograph minutes | (digits) |
| Run | Chronograph | Run |
| Start | Elapsed time counter | Start |
| Stop | | Stop |
| Reset | | Reset |
| | Baro reference | HectoPascals (hPa) |
| | | Inches of Mercury (Hg) |
| | | (digits) HectoPascals (hPa) |
| | | (digits) Inches of Mercury (Hg) |
| | | Standard setting |
| | Flight director | On |
| | | Off |
| Display | ILS symbols | Display |
| Hide | | Hide |
| | Nav display | ILS Rose |
| | | VOR rose |
| | | NAV rose |
| | | Arc |
| | | Plan |
| | | Range 10 |
| | | Range 20 |
| | | Range 40 |
| | | Range 80 |
| | | Range 160 |
| | | Range 320 |
| Display | ADF 1(2) pointer | Display |
| Hide | | Hide |
| Display | VOR 1(2) pointer | Display |
| Hide | | Hide |
| Display | CSTR data | Display |
| Hide | | Hide |
| Display | Waypoint data | Display |
| Hide | | Hide |
| Display | VOR.D data | Display |
| Hide | | Hide |
| Display | Airport data | Display |
| Hide | | Hide |
| | PFD (ND) | Brighter |
| | | Dimmer |
| | | Off |
| | Weather radar | Brighter |
| | | Dimmer |
| | PFD and ND | Interchange |
| | Upper (lower) MFD | Off |
| | | Brighter |
| | | Dimmer |
| Display | Engine page | Display |
| Display | APU page | Display |
| Display | Bleed page | Display |
| Display | Air conditioning page | Display |
| Display | Pressure page | Display |
| Display | Door/oxygen page | Display |
| Display | Electrical page | Display |
| Display | Braking page | Display |
| Display | Hydraulic page | Display |
| Display | Flight Controls page | Display |
| Display | Fuel page | Display |
| Display | All systems page | Display |
| Recall | Caution/warning messages | Recall |
| Display | Status page | Display |
| Clear | Caution/warning message | Clear |
| Cancel | Emergency aural warning | Cancel |
| Cancel | Caution | Cancel |
| Test | T.O configuration | Test |
| | EIS DMC | Norm |
| | | CAPT3 |
| | | F/O 3 |
| | MFD/ND XFR | Norm |
| | | CAPT |
| | | F/O |
| | LANDING GEAR/BRAKES: | |
| | Parking brake | On |
| | | Off |
| | Auto brake | Low mode |
| | | Medium mode |
| | | Max mode |
| | Landing gear | Down |
| | | Up |
| Connect | Pedal steering | Connected |
| Disconnect | | Disconnected |
| | Anti-skid | On |
| | | Off |
| | Nose wheel steering | On |
| | | Off |
| | LIGHTING: | |
| | Overhead lights | Off |
| | | Dimmer |
| | | Brighter |
| | Standby compass light | On |
| | | Off |
| | Dome lights | Off |
| | | Dim |
| | | Bright |
| Test | Annunciate lights | Test |
| | | Dim |
| | | Bright |
| | Main panel flood lights | Off |
| | | Dimmer |
| | | Brighter |
| | Integral lights | Off |
| | | Dimmer |
| | | Brighter |
| | Pedestal flood lights | Dimmer |
| | | Brighter |
| | Glareshield Integral lights | Off |
| | | Dimmer |
| | | Brighter |
| | FCU Integral lights | Dimmer |
| | | Brighter |
| | Console floor lights | Off |
| | | Dim |
| | | Bright |
| | Reading Light | Off |
| | | Dimmer |
| | | Brighter |
| | Avionics compartment light | On |
| | | Auto |
| | Strobe lights | Off |
| | | Auto |
| | | On |
| | Beacon lights | On |
| | | Off |
| | Nav and logo lights | On |
| | | Off |
| | Wing lights | On |
| | | Off |
| | Runway Turnoff lights | On |
| | | Off |
| Retract | Left landing light | Retract |
| | | On |
| | | Off |

-continued

| Lead actions | System | Targets |
|---|---|---|
| Retract | Right landing light | Retract |
| | | On |
| | | Off |
| | Nose lights | T/O |
| | | Taxi |
| | | Off |
| | Seat belt sign | On |
| | | Off |
| | No smoking sign | On |
| | | Off |
| | | Auto |
| | Emergency Exit lights | On |
| | | Off |
| Arm | | Armed |
| | NAVIGATION: | |
| Test | Air Data Display | Test |
| | | TK/GS (track and ground speed) |
| | | PPOS (present position) |
| | | Wind |
| | | HDG (heading) |
| | | STS (action code) |
| | | Off |
| | | System 1 |
| | | System 2 |
| | | System 3 |
| | IR 1(2,3) | Off |
| | | NAV (navigation mode) |
| | | ATT (attitude mode) |
| | Present position | (lat, long) |
| | Present magnetic heading | (degrees) |
| | ADR 1(2,3) | Off |
| | ATT HDG | Norm |
| | | Captain 3 |
| | | F/O 3 |
| | Air data | Norm |
| | | Captain 3 |
| | | F/O 3 |
| | ATC 1 | on (turns ATC 2 to off) |
| | ATC 2 | on (turns ATC 1 to off) |
| | ATC Transponder | Standby |
| | | On |
| | | Auto |
| | Altitude reporting | On |
| | | Off |
| Transmit | Ident | Transmit |
| | ATC transponder code | (digits) |
| | Weather radar | On |
| | | Off |
| | | Normal mode |
| | | Turbulence mode |
| | | Map mode |
| | Weather radar gain | Auto |
| Raise | | Lower |
| Lower | | Higher |
| | | Max |
| | Weather radar antenna | (degrees) up |
| | | (degrees) down |
| | OXYGEN: | |
| Deploy | Passenger O2 Masks | Deployed |
| | Crew O2 Masks | On |
| | | Off |
| | Passenger O2 Announcement | Off |
| Reset | Passenger O2 Timer | Reset |
| | APU: | |
| | APU | On |
| | | Off |
| | | Test |
| | | Reset test |
| | APUStart | On |
| | | Off |

-continued

| Lead actions | System | Targets |
|---|---|---|
| | ENGINES: | |
| | Engine 1(2) | On |
| | | Off |
| | Engine 1(2) mode | Crank |
| | | Normal |
| | | Ignition/start |
| | Engine 1(2) Manual Start | On |
| | | Off |
| | Engine 1(2) FADEC | On |
| | | Off |
| | WARNING: | |
| | GPWS | On |
| | | Off |
| Inhibit | G/S mode 5 warning | Inhibit |
| Inhibit | GPWS mode 4 warning | Inhibit |
| Inhibit | Mode 4 Flap 3 warning | Inhibit |

It is seen that the cabin temperature is only one of a large variety of aircraft system functions which may be displayed and controlled in accordance with the present invention.

Utilizing the cabin temperature example, it will be noted from FIG. 1 that the last command given was "Aft Cabin Temp to 75 degrees" as seen in the "ACTIVE" area 24. The "NEXT" area 26 is blank and is awaiting a command by the pilot.

Figure 2:
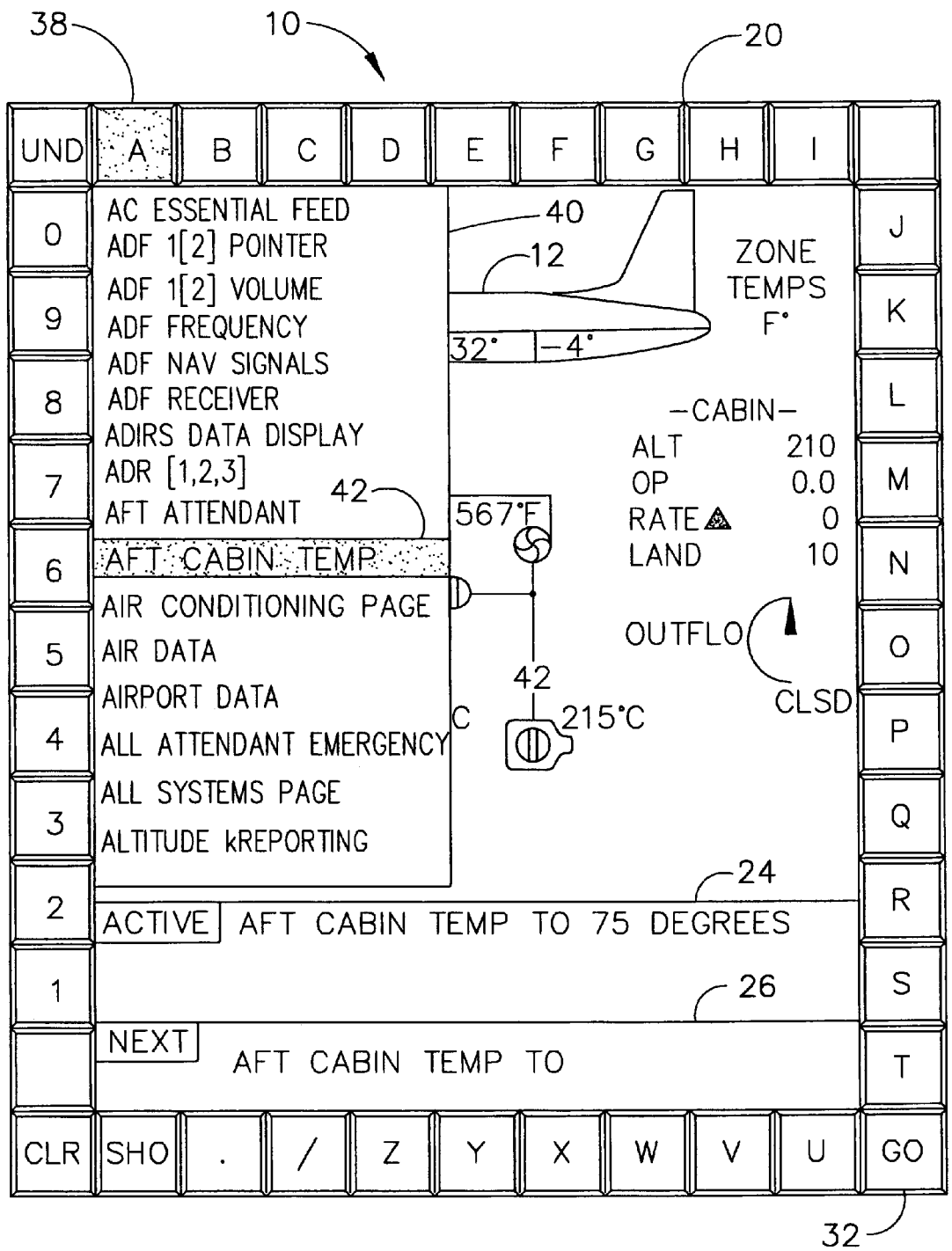
FIG. 2 shows the display of FIG. 1 with a menu of some of the functions beginning with the letter "A"

Assuming, as above, that the pilot desires to have the aft cabin temperature at 80 degrees, he may start by selecting the "A" button (shown as area 38 in black in FIG. 2) at which time a menu appears showing all of the various systems beginning with "A" that exist on the aircraft. In some cases the display of the menu will occur as soon as the "A" area is selected although it may be desired that the selection of "A" as well as other inputs selected by the pilot will be displayed only after some positive action such as double clicking. In any event, the "A" menu will be displayed as, for example, the area shown with reference numeral 40 in FIG. 2 covering the left side of the FIG. 1 display. The pilot may then scroll down and select "Aft Cabin Temp" as shown by black area 42. The words "Aft Cabin Temp" would then appear in the "NEXT" area 26. If the Parser is so programmed, the word "To" will also appear since that is the only action which can be taken with respect to temperature. Alternately, the pilot could enter "To" by pressing "T" and "O" on the keyboard 20 prior to entering the desired temperature.

Figure 3:
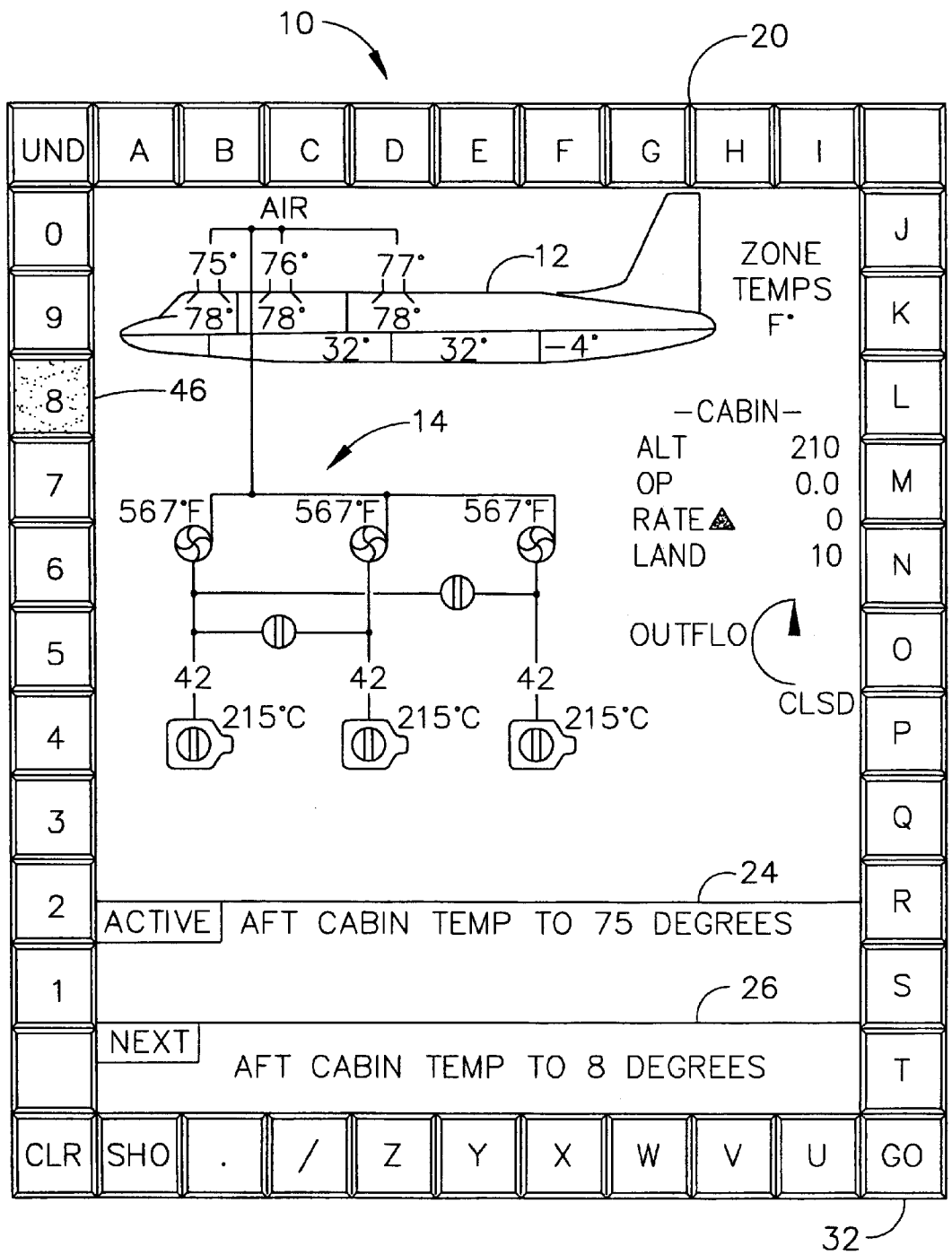
FIG. 3 shows the display of FIG. 1 with the beginning of the desired temperature displayed.
Figure 4:
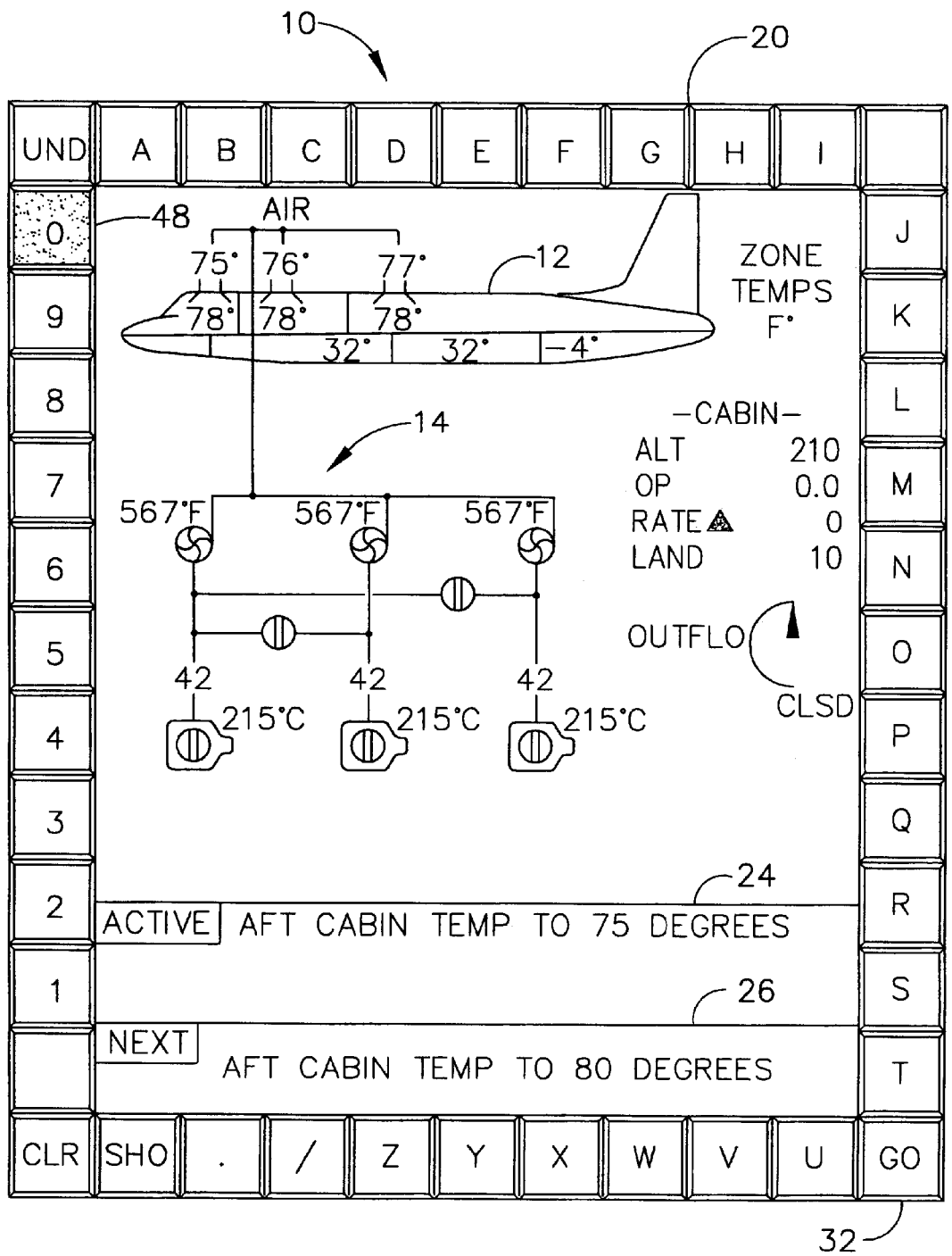
FIG. 4 shows the display of FIG. 1 with the complete desired command being displayed.

In either event, after "Aft Cabin Temp To" shows in the "NEXT" area 26, the pilot would then enter the desired temperature by pressing the "8" in the keyboard area 20 as shown in FIG. 3 as area 46 in black. When this occurs, the "NEXT" area 26 will show "Aft Cabin Temp To 8 Degrees" because the parser assumes that the temperature will be in the units of "degrees". If the "0" were not next added, the command "Aft Temp To 8 Degrees" would be caught as an error by the semantic function of the parser when the "GO" button was pushed since a temperature of 8 degrees Fahrenheit is outside the limits allowed for cabin temperature. FIG. 4 shows the pilot having depressed the "0" in the keyboard 20, as shown by the black area 48, and the result is that the message "Aft Cabin Temp To 80 Degrees" is displayed in the "NEXT" area 26. The pilot may then verify that this is the command desired and press the "GO" button 32 to cause the command to pass to the computer for execution resulting in Aft cabin temperature becoming 80 degrees Fahrenheit. Also, the "ACTIVE" area 24 displaying the message "Aft Cabin Temp to 75 degrees" would change to "Aft Cabin Temp To 80 degrees" so that the viewer will know the last action taken.

It is seen that the system of the present invention is quite versatile and easy to use. The Pilot has control over all of the aircraft systems with a few simple commands all located in the same area, and does not have to search for a particular knob or switch spread out over a large area. The various commands and displays may be easily adjusted to meet individual pilot desires and in present aircraft having very crowded control panels, considerable space savings are obtained.

Figure 5:
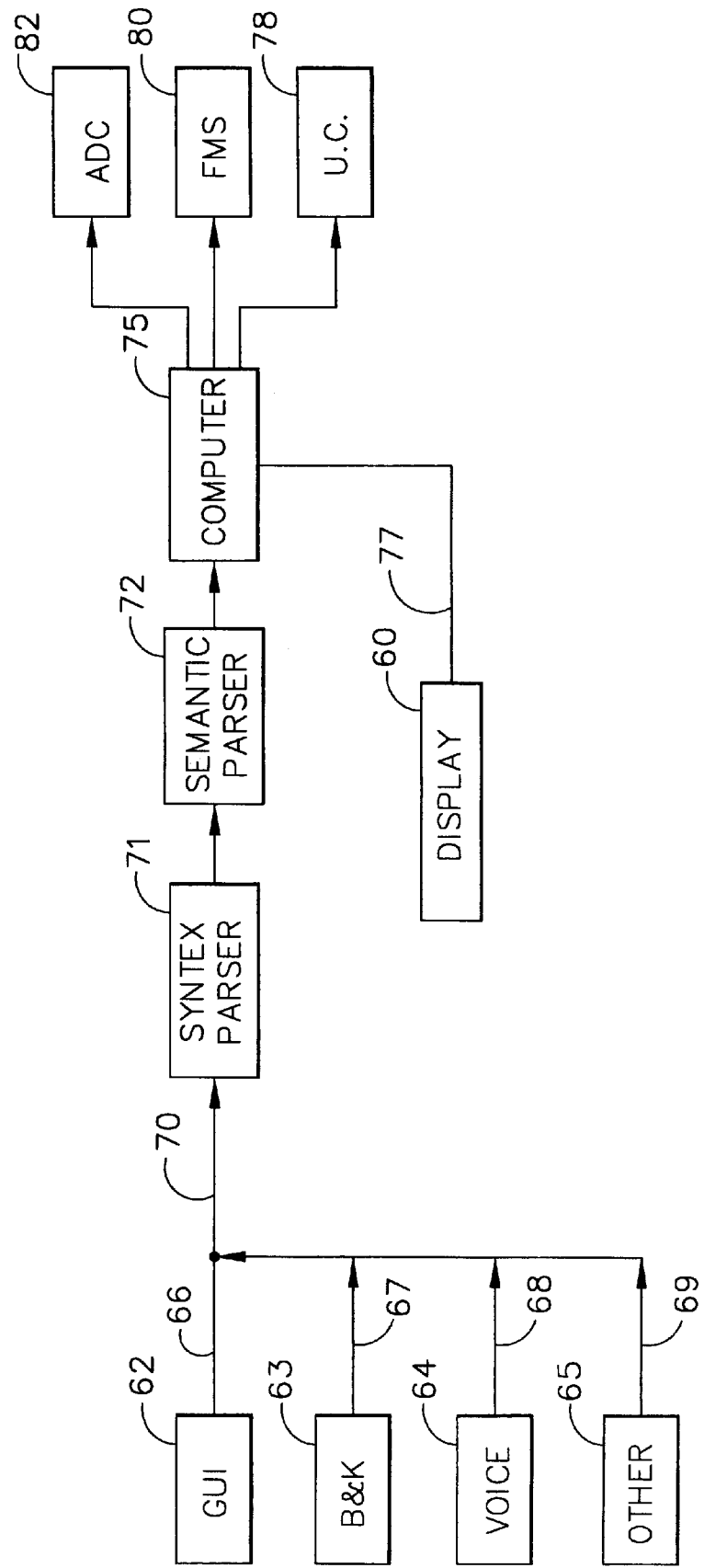
FIG. 5 shows a block diagram of the system of the present invention.

FIG. 5 shows a block diagram of the system of the present invention. In FIG. 5, the display seen in FIGS. 1–4 is represented by a box 60 and the keyboard or cursor control input by a Graphic User Interface (GUI) box 62. The GUI 62 is operated upon by the pilot in the manner described above. There will normally be other input creating devices such as certain Buttons and Knobs (B&K) shown by box 63, Voice commands shown by box 64 and Other inputs as, for example, Data Links shown by box 65. The commands from these inputs are presented over paths shown by arrows 66, 67, 68, 69 and 70 to a Syntactic Parser 71 and a Semantic parser 72. Although shown as two boxes, parsers 71 and 72 would normally be combined in a single unit. The output of the parsers 71 and 72 is presented to a computer or computers 75 which, in most cases, will be an additional computer for the aircraft interior controls. There should be an interconnection (not shown) to the FMS computer already existing on the aircraft so that the utility and Flight Management computer functions can be related as described above. Computer 75 will send any unclear syntax or erroneous semantics back to the display 60 via connection 77, as explained, and will send the command upon receiving a "go" signal to the Utilities Command 78 for performing the desired change. The computer 75 is also connected to presently existing command activators such as the Flight Management System 80 and the Air Data Computer 82 in the same manner heretofore employed.

Figure 6A:
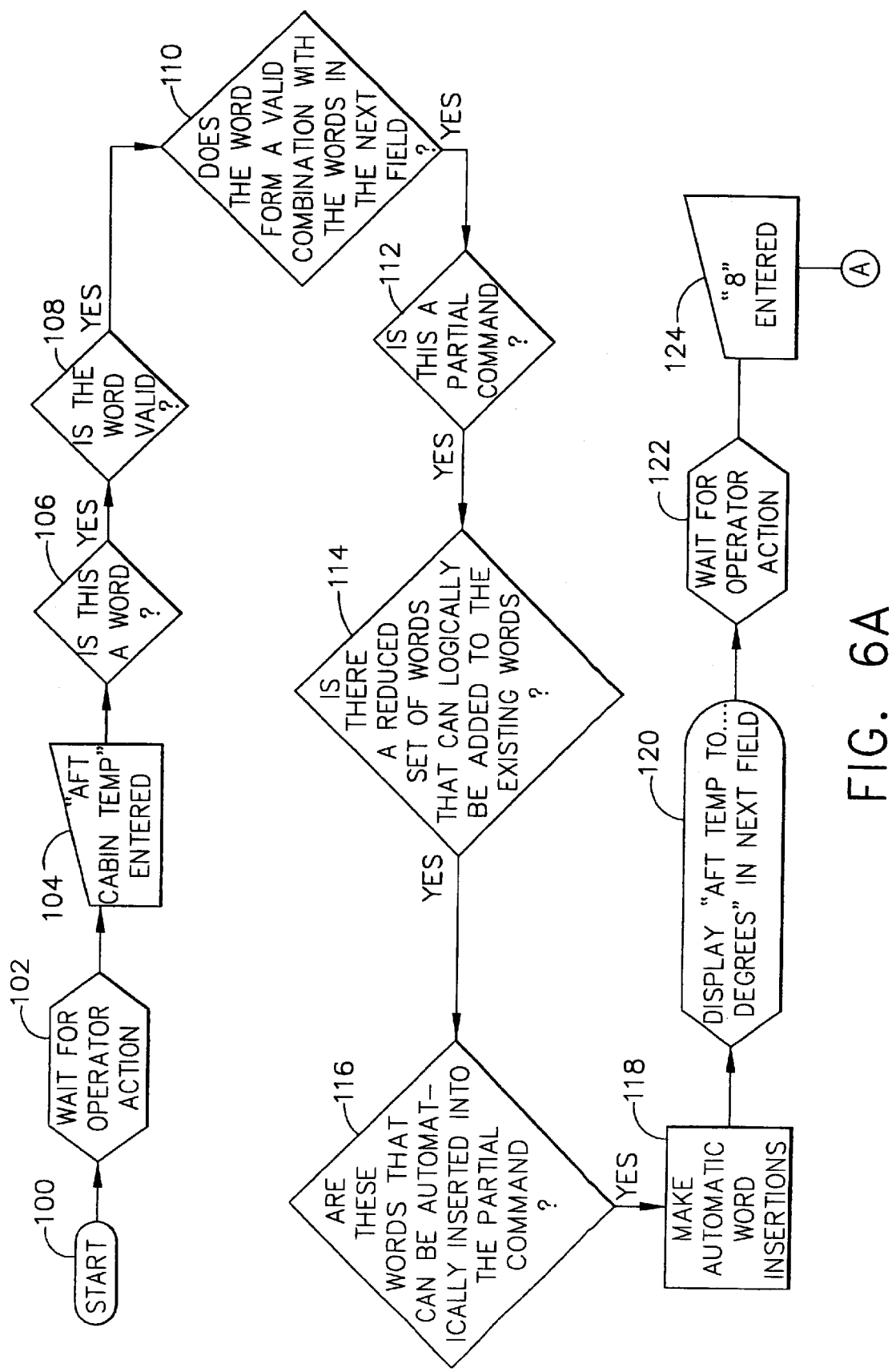
FIGS. 6A and 6B show flow diagrams for the sample used in describing the preferred embodiment.
Figure 6B:
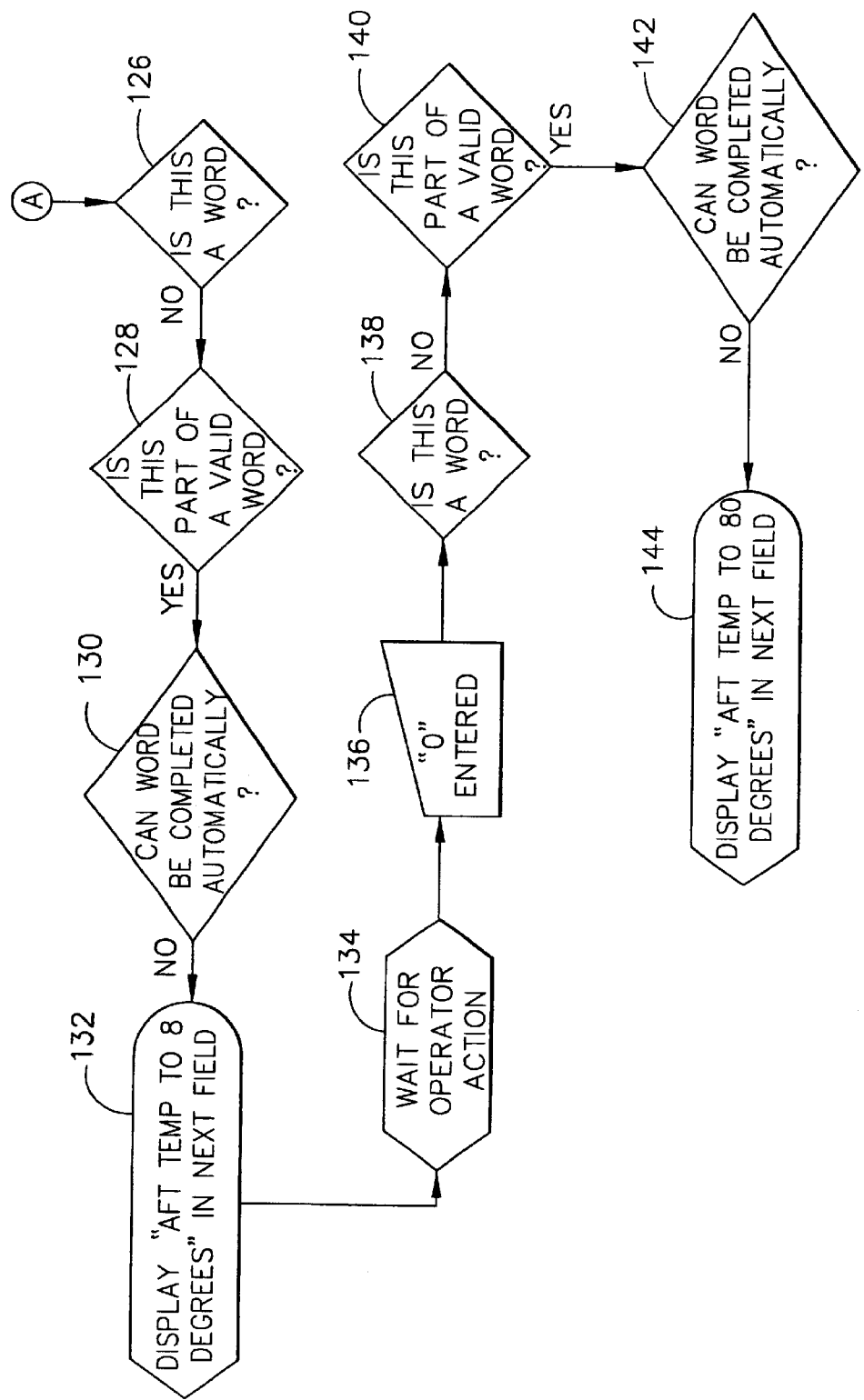

The program for the syntax and semantic parsers is simple and straightforward and an example, based on the above aft cabin temperature change, is seen in FIGS. 6A and 6B. In FIG. 6A, after start in box 100, the system awaits an input command by the operator as seen in box 102. An input is then provided (in this case "Aft Cabin Temp"—which may be entered by highlighting the desired command as in FIG. 2 or by manually depressing the letters around the display in FIG. 2) as shown by box 104. Box 106 then asks whether the entry is a "word" (a word being defined by a string of characters followed by a space). In this case, the answer is "yes", and accordingly box 108 asks if the word is valid. Validity is determined by whether the word is found in the memory of the computer. In this case, the answer is again yes and so the question "does the word form a valid combination with the words in the next field" is asked by box 110. This is done by looking at any previous words that have been entered; in this case, there were none, so the automatic answer is "yes". If there had been a previously entered word such as "pressure", this would not form a valid combination with "Aft Cabin Temp" and in such case the answer would be "no". The next box 112 asks, "is this a partial command?" and since there are no action words, the answer is again "yes." In this case, the word "to" is one that can be logically inserted and so the answer is "yes". Box 114 then asks, "is there a reduced set of words that can be logically added to the existing words?" and in the present case, the word "to" along with the word "degrees" can obviously be added so the answer is "yes". If there had been more than one possible logical answer at box 110, the answer would still be "yes" but the next box 116 asks, "are there words that can be automatically inserted?" If there are more than one, the answer would have to be "no" but in the present case, "to" and "degrees" is the only choice so the answer is "yes". Accordingly, in box 118, the action of inserting the word "to" and "degrees" after the "Aft Cabin Temp" is performed and in box 120 the display is caused to read "Aft Cabin Temp To—Degrees".

After this, the system waits for the next operator input in box 122 and in box 124 the input "8" is received. Because the operator is intending to follow this with a "0", the "8" is not followed by a space. Again the question "is this a word" is asked in box 126 (see FIG. 6B) and because a "word" is defined as a string of characters followed by a space, the answer is "no". Accordingly, the next box 128 asks, "is this part of a valid word?" and since a number is always part of a valid word, the answer is "yes". Next, box 130 asks "can a word be completed automatically?" and since there are many possible completions to a number, the answer is "no". Without an automatic addition, the next box 132 causes the display to read "Aft Temp to 8 degrees" and again the system waits for the operator to provide further input as shown at box 134. Next, at box 136, the "0" is added and in box 138 the question "is this a word?" in box 138 is again asked to which the answer is again "no" since the operator has not typed a space. In fact, this happens so quickly, the final display would normally occur before the operator would have a chance to type a space and seeing the correct display the operator would then probably type "go" to complete the entry. After determining that "0" is not a word, the question "is this part of a valid word is again asked in box 140 and again since numbers are always parts of valid words the answer is "yes". Again the question "can a word be completed automatically?" is asked in box 142 and again the answer is "no", so the display is caused to read "Aft Cabin Temp to 80 degrees". While the system would then go on to await further operator input, the display would now be as the operator wished and the "go" key would be entered, at which time the system would respond so as to change the aft cabin temperature to 80 degrees.

While there are many alternate inputs and responses too numerous to provide in detail, the example above shows that the process for inputting and displaying the desired actions is easily accomplished. If, at any time, the operator inputs a word that is outside the system parameters such as "aft cabin temp to 180 degrees" the system would transfer the input to a string of flow boxes that would end up displaying that the requested command is outside of the aircraft parameters.

It should also be understood that the present invention could work in conjunction with flight management operations. For example, the pilot may desire the landing gear to be lowered upon the reaching of some predetermined altitude during the landing process. Thus "Landing Gear Down Below 300 Feet" could be set up. Even two or more utilities can be made to depend on one another. For example, the pilot might want the cabin lights to lower when the seat belt sign is lighted. Thus "cabin lights dim when seat belt sign on" could be set up.

It is therefore seen that we have provided a simple and understandable way for system commands to effect changes in the multiplicity of systems without the use of the myriad of switches, knobs, and buttons previously employed. Many changes will occur to those having ordinary skill in the art. For example, systems found on devices other than aircraft may utilize the invention. The exact language found in the chart for "system" "actions" and "targets" may change and, in fact, should be altered to fit pilot desires and aircraft specifications. The specific display shown and the peripheral keyboard are matters of design choice. Accordingly, we do not wish to be limited to the specific structures shown in connection with the preferred embodiment.

What is claimed is:

1. A monitor including a computer for use in controlling parameters for a number of variable controllable conditions comprising:

a display for showing a selected condition;

input means under control of an operator to provide signals indicative of a desired change in a parameter of a selected condition in a syntax chosen by the operator;

a parser connected to receive the signals and to place them into syntax recognizable by the computer;

means connecting the parser to the display to show the parsed syntax; and means under the control of the operator to send the parsed signals to the computer for changing of the condition.

2. The apparatus of claim 1 wherein the conditions relate to the operation of a plurality of utility systems on an aircraft.

3. The apparatus of claim 2 wherein the conditions include at least several of air, communications, electrical, fire, flight controls, fuel, hydraulics, instruments, recorders, landing gear, brakes, navigation, oxygen, APU, engines, and warnings.

4. The apparatus of claim 1 wherein the parser is programmed to recognize various words associated with selected conditions as expressed by the operator and to revise them, when necessary, into a language consisting of predetermined words, syntax and semantic rules so to form sentence structures recognizable to both the operator and the computer and upon which the computer can operate.

5. The apparatus of claim 4 wherein the language includes action words, systems words and target words and the action words include a plurality of the following: open, close, display, inhibit, reset, call, disconnect, extend, test, arm, extinguish, erase, start, stop, hide, clear, cancel, retract, transmit, raise, lower, and deploy.

6. The apparatus of claim 4 wherein the language includes action words, systems words and target words and the systems words include a plurality of the following:

AIR SYSTEMS WORDS pack flow, cockpit temp, fwd cabin temp, aft cabin temp, engine bleed, ram air inlet, APU bleed, cross bleed, cargo isolation valve, cargo hot air pressure regulator, cargo temp, cabin pressure, and landing elevation,

COMMUNICATIONS SYSTEMS WORDS

3rd occupant mikes, VHF, HF, transmit, receive, VHF volume, HF volume, INT volume, VORI volume, MKR volume, ILS volume, MLS volume, ADF volume, boom/mask mikes, VOR nav signals, ADF nav signals, audio controls, VOR receiver, ILS receiver, ADF receiver, VOR frequency, ILS frequency, MLS frequency, ADF frequency, standby frequency, BFO, cockpit loudspeaker, PA volume, attendant, forward attendant, aft attendant, mechanic, and all attendant emergency,

ELECTRICAL SYSTEMS WORDS galley electrical, galley battery, APU generator, IDG, bus, external power, AC essential feed, emergency generator, generator, and ram air turbine,

FIRE SYSTEMS WORDS engine, APU, and cargo,

FLIGHT CONTROLS SYSTEMS WORDS

ELAC, SEC, FAC, rudder trim, flaps/slats, speed brakes, pitch trim, autopilot, radio, and avionics,

FUEL SYSTEMS WORDS center pump, right pump, left pump, and cross feed,

HYDRAULIC SYSTEMS electric pump, engine pump, pump override, leak measurement valves, RAT, engine anti-ice, window heat, probe heat, L/R wiper, rain repellent, and wing anti-ice,

INSTRUMENTS/RECORDERS SYSTEMS WORDS

CVR, DFDR, chronograph, chronograph month, chronograph year, chronograph day, chronograph hours, chronograph minutes, elapsed time counter, baro reference, flight director, ILS symbols, nav display, ADF pointer, VOR pointer CSTR data, waypoint data, VOR.D data, airport data, PFD (ND), weather radar, PFD and ND, upper/lower MFD, engine page, APU page, bleed page, air-conditioning page, pressure page, door/oxygen page, electrical page, hydraulic page, electrical page, breaking page, hydraulic page, flight controls page, fuel page, all systems page, caution/warning message, emergency aural warning, caution, T.O.configuration, EIS DMC, and MFD/ND XFR,

LANDING GEAR/BREAKS SYSTEMS WORDS parking brake, auto brake, landing gear, pedal steering, anti-skid, and nose wheel steering,

LIGHTING SYSTEMS WORDS overhead lights, standby compass light, dome lights, annunciator lights, main panel flood lights, integral lights, pedestal flood lights, glareshield integral lights, FCU integral lights, console floor lights, reading light, avionics compartment light, strobe lights, beacon lights, nav and logo lights, wing lights, runway turnoff lights, left landing light, right landing light, nose lights, seat belt sign, no smoking sign, and emergency exit lights,

NAVIGATION SYSTEMS WORDS air data display, IR, present position, present magnetic heading, ADR, ATT HDG, air data, ATC, altitude reporting, ident, ATC transponder code, weather radar, weather radar gain, and weather radar antenna,

OXYGEN SYSTEMS WORDS passenger O2 masks, crew O2 masks, passenger O2 announcement, and passenger O2 timer,

ENGINES SYSTEMS WORDS engine, engine mode, engine manual start, and engine FADEC

WARNING SYSTEMS WORDS

GPWS, G/S mode 5 warning, GPWS mode 4 warning, and mode 4 flap 3 warning.

7. The apparatus of claim 4 wherein the language includes action words, systems words and target words and the target words include a plurality of the following:

low, normal, high, degrees F, degrees C, on, off, opened, closed, auto, manual, ditch, #ft., captain, first officer, display, AM mode, VHF, HF, cabin attendants, internal, VOR, MKR, ILS, MLS, ADF, cabin, higher (up), lower (down), neutral, radio, reset, flight management guidance sys, FMGS, active, softer, louder, max, PA, connected, disconnected, alternate, extend, armed, extinguish, test, left, right, position, retract, erase, set event, start, stop, run, hecto pascals, inches of mercury, standard setting, ILS rose, VOR rose, NAV rose, arc, plan, range 10, range 20, range 40, range 80, range 160, range 320, brighter, dimmer, interchange, clear, CAPT, F/O, low mode, medium mode, max mode, T/O, taxi, TK/GS, PPOS, wind, HDG,STS, system 1, system 2, system 3, lat, long, degrees, standby, transmit, normal mode, turbulence mode, map mode, deployed, crank, and ignition/start.

8. The apparatus of claim 1 wherein the input means includes a device on which the operator can type a desired change in the display.

9. The apparatus of claim 8 wherein the device is positioned around the periphery of the display.

10. The apparatus of claim 2 wherein the utility system is air temperature, the display shows the present air temperature, and the operator can input a change of air temperature utilizing the input means.

11. The apparatus of claim 1 wherein the operator can input a word combination including at least one word indicative of the desired condition change and the parser will recognize the word and interpret that as a desire to change the condition so as to produce an input word combination which the computer recognizes as a command to change the condition.

12. A system according to claim 2 wherein utility system commands can be combined with flight management commands and states.

13. The system according to claim 1 wherein the parser controls both the syntax of the desired change in a parameter of a selected condition and the semantics of the a desired change in a parameter of a selected condition to assure that desired changes are within the normal limits of the selected condition.

14. The system according to claim 13 wherein the parser provides a display to the operator warning that a desired change in a parameter of a selected condition is outside the normal limits of the selected condition.

15. A system for controlling a plurality of aircraft cabin functions comprising:

a display;

an I/O device for entering desired commands;

means connecting the I/O device to the display to show the desired commands;

a parser for receiving command from the I/O device and placing it in a predetermined syntax for use by a computer; and a computer connected to receive the predetermined syntax and upon receiving an execution command to activate the desired control for accomplishment of the desired command.

16. The system of claim 15 wherein the parser includes a syntax function and a semantic function which assures that a desired command is within predetermined desired limits.

17. The method of controlling variable system functions comprising the steps of:

1) entering a desired command on an I/O device;

2) supplying the entered command to a parser programmed to place received commands into proper format for use by a computer;

3) displaying the format of the parser;

4) supplying a "go" command when the received command is properly formatted and is determined to be properly addressing the desired command; and 5) energizing a control device to perform the desired command upon receipt of the "go" signal.

18. The method of claim 17 wherein the proper formatting of step 2 includes both proper syntax and proper semantics.

19. The method of claim 18 wherein step 3) includes displaying a warning when a received command is outside the limits of variation of the function.

* * * * *